United States Patent

Miess et al.

Patent Number: 5,266,672
Date of Patent: Nov. 30, 1993

[54] AROMATIC COPOLYAIDE FROM DIAMINO BENZANILIDE

[75] Inventors: Georg-Emerich Miess, Königstein/Taunus; Peter Klein, Wiesbaden; Karl Heinrich, Grossaitingen, all of Fed. Rep. of Germany

[73] Assignee: Hoechst Aktiengesellschaft, Frankfurt, Fed. Rep. of Germany

[21] Appl. No.: 905,893

[22] Filed: Jun. 29, 1992

[30] Foreign Application Priority Data

Jul. 2, 1991 [DE] Fed. Rep. of Germany ........ 4121801

[51] Int. Cl.$^5$ .................. C08G 69/12; C08G 69/32
[52] U.S. Cl. .................... 528/184; 528/183; 528/190; 528/191; 528/310; 528/329.1; 528/331; 528/340; 528/344
[58] Field of Search .............. 528/184, 329.1, 183, 528/190, 191, 310, 331, 340, 344

[56] References Cited

U.S. PATENT DOCUMENTS

| | | | |
|---|---|---|---|
| 3,869,429 | 3/1975 | Blades | 260/78 |
| 4,075,172 | 2/1978 | Ozawa et al. | 260/47 |
| 4,413,114 | 11/1983 | Shimada et al. | 528/183 |
| 4,507,467 | 3/1985 | Shimada et al. | 528/329.1 |
| 4,987,216 | 1/1991 | Keil et al. | 528/329.1 |

*Primary Examiner*—Harold D. Anderson
*Attorney, Agent, or Firm*—Connolly and Hutz

[57] ABSTRACT

Aromatic copolyamides are described which are soluble in organic polyamide solvents and which essentially consist of the recurring structural units of the formulae Ia, Ib and Ic $$[-OC-R^1-CO-NH-R^2-NH-], \quad (Ia)$$

$$[-OC-R^1-CO-NH-R^3-NH-], \quad (Ib)$$

$$[-OC-R^1-CO-NH-R^4-NH-], \quad (Ic)$$

wherein $R^1$ and $R^4$ are divalent aromatic radicals, the valency bonds of which are in the para position or in a comparable coaxial or parallel position relative to one another, $R^2$ is a radical of the formula III

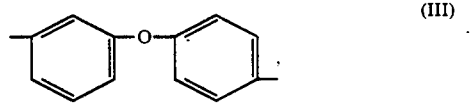

and $R^3$ is a radical of the formula IV

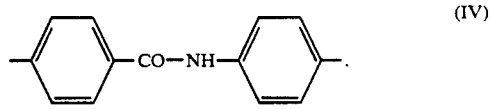

The mole fractions of the individual structural features in the copolyamides are fixed within selected limits. Fibers composed of the copolyamides claimed are distinguished by a high stretchability.

11 Claims, No Drawings

AROMATIC COPOLYAIDE FROM DIAMINO BENZANILIDE

The invention relates to novel aromatic copolyamides of the dicarboxylic acid/diamine type which can be spun from their solutions in organic solvents and to shaped structures produced therefrom, such as filaments, fibers, fiber pulp, films, sheets and membranes having a very high initial modulus (modulus of elasticity), and to a process for their preparation.

As is known, aromatic polyamides (polyaramides) are raw materials of high thermal and chemical stability and low combustibility. Thus, for example, fibers and sheets made of such raw materials show very good mechanical properties, such as high strength and high initial modulus (modulus of elasticity) and are very suitable for industrial fields of application—for example for reinforcing plastics or as filter materials.

It is known that filaments or fibers made of polyaramides having high strength and a high initial modulus can be prepared if the amide bonds at the aromatic rings can be orientated coaxially or virtually parallel to one another, as a result of which rigid, rod-like polymer molecules are formed.

A typical polyamide of this type is, for example, poly(p-phenyleneterephthalamide). Filaments made of this material are described, for example, in German Patent 22 19 703.

This polyamide has a number of advantages, but its preparation and its processing are very difficult. Because of the poor solubility in polar organic solvents—even in the presence of inorganic salts, such as calcium chloride or lithium chloride, as solubilizing agents—this polymer already precipitates from the reaction medium shortly after it is formed. It must be isolated, washed, dried and then redissolved in a spinning solvent. The preferred solvent for preparation of the spinning solutions is concentrated sulfuric acid, which gives rise to particular problems in respect of handling (operational safety, corrosion) and waste disposal.

An attempt has therefore been made to avoid these difficulties by developing copolyamides which have good solubility in the known amide solvents and which can also be spun readily and the filaments of which are distinguished by high strength values and initial moduli after stretching.

Thus, for example, in German Patent 25 56 883 and in German Offenlegungsschrift (German Published Specification) 30 07 063 copolyamides of terephthalic acid, p-phenylenediamine and 3,4'-diaminodiphenyl ether have been described which give isotropic solutions in amide solvents, which solutions can be spun readily. The filaments acquire high strengths and moduli as a result of very high stretching. Here, the increased solubility is caused by the meta-orientation and the oxygen atom. However, there is still a need for aramides which can be processed from known amide solvents to give fibers of high strengths and moduli and which can be processed in as economical a manner as possible to give shaped structures. When producing multifilament yarns of predetermined fineness, the throughput through the installation and thus the economy of the spinning process is mainly determined by the spinning speed and the maximum achievable stretching ratio. In contrast to the achievable stretching ratio, the spinning speed is in general independent of the composition of the polymers. In order to achieve a high throughput through the installation, polymers must therefore be developed which can be processed to give fibers which are distinguished by an achievable stretching ratio which is as high as possible.

The object on which the present invention is based is, therefore, to find further aromatic copolyamides which are distinguished by good solubility in polyamide solvents and by good spinability, which can be spun to give highly stretchable filaments and from which filaments having good mechanical properties can be produced.

The copolyamides according to the invention are characterized by the presence of selected aromatic diamine components in selected proportions.

The invention relates to aromatic copolyamides which are soluble in organic polyamide solvents and which essentially consist of at least 95 mol % of recurring structural units of the formulae Ia, Ib and Ic and, optionally, of up to 5 mol % of recurring structural units of the formula Id

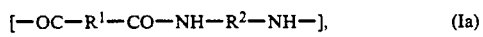
$[-OC-R^1-CO-NH-R^2-NH-]$, (Ia)

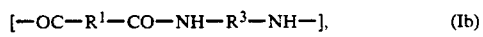
$[-OC-R^1-CO-NH-R^3-NH-]$, (Ib)

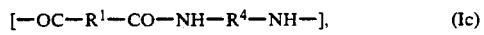
$[-OC-R^1-CO-NH-R^4-NH-]$, (Ic)

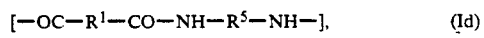
$[-OC-R^1-CO-NH-R^5-NH-]$, (Id)

where the mole fractions of the radicals $R^2$, $R^3$ and $R^4$ in the copolyamides containing the structural units of the formulae Ia, Ib and Ic, based on the sum of these radicals in the copolyamide, lie within the following limits:

Radical $R^2$: 30 to 70 mol %, preferably 40 to 60 mol %,
Radical $R^3$: 10 to 60 mol %, preferably 10 to 40 mol %, and in particular 20 to 30 mol %, and
Radical $R^4$: 10 to 60 mol %, preferably 10 to 40 mol % and in particular 20 to 30 mol %.

In the above formulae Ia to Id, $R^1$ is, to the extent of at least 95 mol %, based on all radicals $R^1$ in the copolyamide, a radical of the formula IIa, and up to 5 mol % of all radicals $R^1$ can have a structure of the formula IIb

$-Ar^1-$, (IIa)

$-Ar^2-$, (IIb)

wherein $Ar^1$ is a divalent aromatic radical, the valency bonds of which are in the para position or a comparable coaxial or parallel position relative to one another, and which is optionally substituted by one or two inert radicals, and $Ar^2$ is a divalent aromatic radical, the valency bonds of which are in the meta position or in a comparable angled position relative to one another, and which is optionally substituted by one or two inert radicals.

In the above formulae Ia to Id, $R^2$ is a radical of the formula (III)

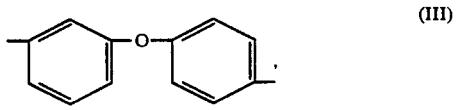

(III)

$R^3$ is a radical of the formula IV

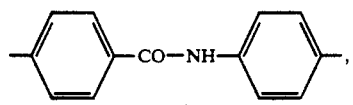 (IV)

$R^4$ is a divalent aromatic radical with the exception of the radical of the formula IV, the valency bonds of which are in the para position or in a comparable coaxial or parallel position relative to one another, and which is optionally substituted by one or two inert radicals, and $R^5$ is a radical which is selected from one of the structures defined for $Ar^2$.

If any substituents in the radicals $Ar^1$, $Ar^2$, $R^4$ or $R^5$ are inert radicals, these can be monovalent inorganic radicals, such as halogen, or monovalent organic radicals, such as alkyl, alkoxy, bis-(N-alkyl)-amino, bis-(N-alkyl)-amido or nitrile. The term "inert radical" signifies that these substituents do not react under the conditions for the preparation and processing of the copolyamides according to the invention.

Preferred inert radicals are chlorine or $C_1$-$C_6$-alkyl or $C_1$-$C_6$-alkoxy, in particular straight-chain $C_1$-$C_6$-alkyl or alkoxy. Examples of such radicals are methyl, ethyl, n-propyl, isopropyl, n-butyl, n-pentyl and n-hexyl or methoxy, ethoxy, n-propyloxy, isopropyloxy, n-butyloxy, n-pentyloxy or n-hexyloxy.

Particularly preferred inert radicals are chlorine, methoxy or methyl.

If any radicals denote divalent aromatic radicals, the valency bonds of which are in the para position or in a comparable coaxial or parallel position relative to one another, these radicals are mononuclear or polynuclear aromatic hydrocarbon radicals or heterocyclic-aromatic radicals, which can be mononuclear or polynuclear. In the case of heterocyclic-aromatic radicals, these have, in particular, one or two oxygen, nitrogen or sulfur atoms in the aromatic ring.

Polynuclear aromatic radicals can be fused with one another or can be bonded linearly to one another via C—C bonds or via a —CO-NH group.

The valency bonds, which are in a coaxial or parallel position relative to one another, face in opposite directions. An example of coaxial bonds facing in opposite directions are the diphenyl 4,4' bonds. An example of parallel bonds facing in opposite directions are, for example, the naphthalene 1,5 or 2,6 bonds, whereas the naphthalene 1,8 bonds are aligned in parallel.

Examples of preferred divalent aromatic radicals, the valency bonds of which are in the para position or in a comparable coaxial or parallel position relative to one another, are mononuclear aromatic radicals having free valencies in the para position relative to one another, in particular 1,4-phenylene, or binuclear fused aromatic radicals having parallel bonds facing in opposite directions, in particular 1,4-, 1,5- and 2,6-naphthylene, or binuclear aromatic radicals which are linked via a C—C bond and have coaxial bonds facing in opposite directions, in particular 4,4'-biphenylene.

Particularly preferred radicals $R^4$ are 1,4-phenylene. $Ar^1$ is preferably 1,4-phenylene.

If any radicals are divalent aromatic radicals, the valency bonds of which are in the meta-position or in a comparable angled position relative to one another, these are mononuclear or polynuclear aromatic hydrocarbon radicals or heterocyclic-aromatic radicals, which can be mononuclear or polynuclear. In the case of heterocyclicaromatic radicals, these have in particular one or two oxygen, nitrogen or sulfur atoms in the aromatic ring.

Polynuclear aromatic radicals can be fused with one another or linked to one another via C—C bonds or via bridge groups such as, for example, —O—, —CH$_2$—, —CO-NH—, —S—, —CO— or —SO$_2$—.

Examples of polynuclear aromatic radicals, the valency bonds of which are in an angled position comparable to the meta position, are 1,6-naphthylene, 2,7-naphthylene or 3,4'-biphenylene.

A preferred example of a mononuclear aromatic radical of this type is 1,3-phenylene.

The polyamides according to the invention can contain unsubstituted radicals and substituted radicals alongside one another in varying proportions.

The polyamide can contain one type or several types of substituted radicals $Ar^1$, $Ar^2$, $R^4$ and $R^5$; for example, it can contain exclusively methyl-substituted radicals or it can contain proportions of radicals having diverse alkyl substituents and/or having halogen substituents.

The polyamides according to the invention can, however, also contain exclusively unsubstituted or substituted radicals $Ar^1$, $Ar^2$, $R^4$ and $R^5$. Those polyamides according to the invention which contain only unsubstituted radicals or which contain up to about 30 mol % of substituted radicals, based on the polymer, are preferred.

For preparation of the copolyamides containing the recurring structural units Ia, Ib and Ic and, where appropriate, Id, a dicarboxylic acid dichloride of the formula V is expediently reacted with a mixture of the diamines of the formulae VI, VII and VIII and, where appropriate, IX

| | |
|---|---|
| ClOC—$R^1$—COCl, | (V) |
| $H_2N$—$R^2$—$NH_2$, | (VI) |
| $H_2N$—$R^3$—$NH_2$, | (VII) |
| $H_2N$—$R^4$—$NH_2$, | (VIII) |
| $H_2N$—$R^5$—$NH_2$, — | (IX) | wherein $R^1$ to $R^5$ have the meaning defined further above.

The dicarboxylic acid dichloride of the formula V and the individual diamine types can also be used in the form of mixtures.

The proportions of the diamines VI, VII and VIII and, where appropriate, IX are in this case to be chosen in such a way that polyamides having the above-defined proportions of radicals $R^2$, $R^3$ and $R^4$ are formed.

It is obvious to those skilled in the art that the sum of all of the structural units derived from aromatic acids and the sum of all of the structural units derived from aromatic amines are essentially identical, i.e. they differ by at most about 1% and preferably by at most about 0.2%, and in particular are identical within the scope of the practical measuring and metering possibilities.

The molecular weight of the polyamides formed can be controlled, inter alia, via the selection of the proportions of aromatic acids to aromatic amines. These selection criteria are known to those skilled in the art of polycondensation.

Examples of suitable aromatic dicarboxylic acids, from which the dicarboxylic acid dichlorides of the formula V are derived, are naphthalene-1,4-dicarboxylic acid, naphthalene-1,5-dicarboxylic acid, naphthalene-2,6-dicarboxylic acid, biphenyl-4,4,-dicarboxylic acid, 2-chloroterephthalic acid, 2-bromoterephthalic acid, 2-methylterephthalic acid and in particular terephthalic acid.

Up to 5 mol % of the dicarboxylic acid dichlorides can also be derived from radicals $Ar^2$. Examples of acids from which dicarboxylic acid dichlorides of this type are derived are naphthalene-1,6-dicarboxylic acid, naphthalene-1,7-dicarboxylic acid, naphthalene-2,7-dicarboxylic acid, biphenyl-3,4'-dicarboxylic acid and in particular isophthalic acid.

The diamine of the formula VI which is used is 3,4'-diaminodiphenyl ether.

The diamine of the formula VII which is used is 4,4'-diaminobenzanilide.

Examples of suitable diamines of the formula VIII are naphthalene-1,4-diamine, naphthalene-1,5-diamine, naphthalene-2,6-diamine, benzidine and in particular p-phenylenediamine.

Examples of suitable diamines of the formula IX are naphthalene-1,6-diamine, naphthalene-1,7-diamine, naphthalene-2,7-diamine, biphenyl-3,4'-diamine, 3,4'-diaminobenzanilide and m-phenylenediamine.

The copolymerization of the monomer compounds described above is in general carried out as solution polymerization.

To this end the aromatic monomer compounds to be reacted with one another are as a rule dissolved in an organic solvent. The organic solvent preferably contains at least one solvent of the amide type, such as, for example, N-methyl-2-pyrrolidone, N,N-dimethylacetamide, tetramethylurea, N-methyl-2-piperidone, N,N'-dimethylethyleneurea, N,N,N',N'-tetramethylmaleamide, N-methylcaprolactam, Nacetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea. Preferred organic solvents of importance for the process according to the invention are N-methyl-2-pyrrolidone, N,N-dimethylacetamide and a mixture of these compounds.

In a preferred embodiment of the solution polymerization, the aromatic monomer diamines are dissolved in an amide solvent. The solution thus obtained is then mixed with the at least one aromatic monomer compound in the form of an aromatic dicarboxylic acid dihalide, with vigorous stirring, in order to initiate the copolymerization.

In this process the amide solvent is used not only as solvent for the aromatic monomer compounds and the aromatic copolyamide obtained therefrom but also as acid acceptor for a hydrogen halide, for example for hydrogen chloride, which is formed as a by-product from the copolymerization of the aromatic monomeric compounds. In some cases it can be advantageous to use an additive which promotes the solubility, for example a metal halide of one of the metals of group I or II of the periodic system, which additive is added to the copolymerization mixture before, during or after the copolymerization.

Examples of such additives are alkali metal halides, such as lithium chloride, or alkaline earth metal halides, such as calcium chloride.

The polycondensation temperatures in the case of the solution polymerization are usually between $-20°$ C. and $+120°$ C. and preferably between $+10°$ C. and $+100°$ C. Particularly good results are obtained at reaction temperatures of between $+10°$ C. and $+80°$ C.

The sum of the concentrations of the aromatic monomer compounds in the polymerization mixture solution can be adjusted taking account of the desired degree of polymerization, the desired viscosity of the polymerization mixture, the nature of the aromatic monomer compounds used, the nature of the solvent used and the desired polymerization temperature. In this context, the most advantageous sum of the concentrations can be determined on the basis of a series of preliminary experiments for the course of the polymerization.

Polycondensation reactions are preferably carried out in such a way that 2 to 15 and preferably 5 to 10% by weight of polycondensation product are present in the solution after the reaction is complete. Particularly good results are obtained with concentrations of 5.0 to 7.5% by weight.

In the course of the polycondensation, the molecular weight of the polymer, and thus also the viscosity of the reaction batch, increases.

An adequate molecular chain length is achieved when the viscosity of the polymer solution obtained from the polycondensation corresponds to an inherent viscosity of the polymer of about 2.5 to 7.0 dl/g.

Inherent viscosity is understood to mean the expression $$\eta_{inh} = \frac{\ln \eta_{rel}}{c}.$$

In this expression $\eta_{rel}$ denotes the relative viscosity and c the concentration used, in g/100 ml.

For the purposes of the present invention, it is determined for solutions of, in each case, 0.5 g of polymer in 100 ml of 98% strength by weight sulfuric acid at 25° C.

The process outlined for the preparation of aromatic polyamides, which is known per se, is, insofar as it serves for preparation of the aromatic polyamides according to the invention described above, also a subject of the invention.

If the polymer solution has reached the viscosity required for further processing, the polycondensation can be stopped in the conventional manner by the addition of monofunctional compounds such as, for example, acetyl chloride. The hydrogen chloride formed, which is bonded in salt form to the amide solvent, can then be neutralized by the addition of basic substances.

Substances suitable for this purpose are, for example, lithium hydroxide and calcium hydroxide, but in particular calcium oxide.

The aromatic copolyamide obtained when carrying out the process according to the invention can be separated off from the copolymerization mixture by means of a separation process, for example by precipitation. To prepare a solution for shaping the copolyamide, the aromatic copolyamide obtained in this way is then dissolved in a suitable organic solvent, this process being designated the dissolution process for the preparation of the shaping solution.

In the cases in which the solution polymerization process is used to prepare the aromatic copolyamide according to the invention, the copolyamide, because it is outstandingly soluble in the solvent for the polymerization, is, however, completely dissolved in this solvent. For industrial use of the process according to the invention it is therefore advantageous to use the mixture obtained from the polymerization immediately as shaping solution for the aromatic copolyamide.

The aromatic copolyamide according to the invention is outstandingly soluble in an organic solvent, for example in organic solvents of the amide type, and has an outstanding thermal stability and a superior chemical resistance. The aromatic copolyamide according to the invention is particularly useful for the production of diverse shaped articles, for example filaments, fibers, yarns, films and sheets, which are likewise a subject of the invention. These structures not only have an outstanding thermal stability and chemical resistance but also have superior mechanical properties, for example in respect of the tensile strength, the abrasion resistance and the modulus of elasticity. The solution of the aromatic copolyamide can also be used in various ways, for example for the production of fibers, sheets, sheet-like elements, fiber materials and other shaped articles.

The solvent used in the process for the preparation of the shaping solution of the aromatic copolyamide is preferably a solvent of the amide type, in particular the solvents of the amide type mentioned further above, or a mixture of two or more of the said compounds.

For preparation of the shaping solution it is advantageous if the concentration of the aromatic copolyamide is kept within a range between 4 and 15% by weight, in particular between 5 and 10% by weight. If necessary, the shaping solution can contain an additive to promote the solubility, in which case at least one metal halide of a metal of groups I and II of the periodic system can be used, for example lithium chloride, calcium chloride or magnesium bromide, specifically in a concentration of between 0.2 and 10% and preferably of between 0.5 and 5%, based on the total weight of the shaping solution. The additive to promote the solubility also promotes the stability of the shaping solution at elevated temperature.

Shaping of the shaping solution to give a shaped article can be carried out by any suitable dry process, wet process or dry/wet process. In the cases in which a wet process is used, for example in order to shape the shaping solution into filaments, the shaping solution or—in this case—the spinning solution is extruded through a die, for example a spinneret, into a coagulating liquid. With this procedure it is usually advantageous if the coagulation liquid consists of water or of an aqueous solution containing a polar organic solvent. In this case the polar organic solvent can be selected from the same amide solvents which are usually used to dissolve the aromatic copolyamide.

The polar organic solvent used in the coagulation liquid is preferably the same solvent which is contained in the shaping solution. The coagulation liquid is preferably used at a temperature of between 0° C. and the boiling point of the coagulation liquid under atmospheric pressure.

The polar organic solvent is present in the coagulation liquid preferably in a concentration of 70% by weight or less, in particular 50% by weight or less.

The shaping process described above is particularly suitable for the production of sheets or filaments from a shaping solution.

When producing filaments from the aromatic copolyamide, the shaping or spinning solution is extruded through a spinning head with several spinning orifices, the filament-shaped streams of the spinning solution being solidified in one of the coagulation liquids indicated above (wet process) or in an atmosphere promoting evaporation (dry process). A conventional horizontal or vertical wet spinning machine, a dry-die wet spinning machine or a spinning machine in which the material flow takes place downwards under stress can be used for spinning. A variant which is also suitable is the so-called "dry-die wet spinning process", as is described, for example, in US-A-34 14 645.

When wet-spinning an aromatic copolyamide according to the invention, the coagulation is preferably effected with the use of a coagulation liquid containing an additive for promoting coagulation, this coagulation being followed by a further coagulation step in the course of which the coagulating filaments of the aromatic copolyamide are fed into a water bath which is kept at a temperature of between 0° and 100° C.

In this procedure, the additional coagulation step serves to complete the coagulation by removal of the solvent. In addition, additives for promoting coagulation, if such substances are used, are washed out of the coagulated filaments.

It is clear from the above description that the aromatic copolyamide according to the invention can be processed to filaments without any problems using conventional spinning processes and apparatus, without it being necessary to use a hazardous or harmful solvent such as, for example, concentrated sulfuric acid.

As a result, the risks to the operators are reduced. Moreover, the filaments produced from the copolyamide according to the invention have a dense internal structure.

The shaping solution can also be processed to a film or a sheet using conventional fanning or extrusion processes.

Filaments or sheets which are produced by the shaping processes indicated above are usually subjected to a stretching operation, which promotes not only the mechanical properties such as, for example, the tensile strength and the modulus of elasticity but also the thermal characteristics, such as, for example, the thermal stability of the filaments or sheets produced in this way.

Filaments composed of the aromatic copolyamides according to the invention are as a rule stretched in order to achieve a high mechanical strength and a high modulus of elasticity. The stretching ratio is usually about 1:6 to 1:20. The stretching temperature is as a rule between 250° and 500° C., preferably between 300° and 450° C.

Stretching can be carried out in a single step, in two steps or in several steps and a hotplate or a cylindrical heating device can be used for heating. In addition, the stretched filaments or sheets can be subjected to a further heat treatment at the same or a higher temperature, in order to promote their crystalline structure. In this context it is pointed out that the aromatic copolyamide according to the invention is not only surprisingly advantageous in respect of its solubility in conventional organic solvents but can also be stretched without difficulty under "mild" operating conditions after the production of the filaments or sheets.

The filaments, fibers or fiber materials composed of an aromatic copolyamide according to the invention, which have outstanding mechanical and thermal properties and are distinguished by high stretchability, can be used industrially in very diverse ways, for example as reinforcing materials for fabric inlays in car tires and other rubber articles, as heat-resistant insulation materials, for the production of filter fabrics and as lightweight insulating materials. In addition, films or sheets composed of an aromatic copolyamide according to the invention can be used as heat-resistant electrical insulating materials.

Further characteristics and advantages of the invention are explained in more detail below with the aid of examples.

However, it is understood that the invention is not restricted to the illustrative examples. On the contrary, on the basis of the illustrative examples, numerous possibilities for modifications and/or supplementations are available to those skilled in the art, without it being necessary to depart from the basic concept of the invention.

EXAMPLE 1

Aromatic copolyamide composed of 100 mol % of terephthalic acid dichloride, 25 mol % of p-phenylenediamine, 25 mol % of 4,4'-diaminobenzanilide and 50 mol % of 3,4'-diaminodiphenyl ether 10.8 g (0.1 mol) of p-phenylenediamine, 40.0 g (0.2 mol) of 3,4'-diaminodiphenyl ether and 22.7 g (0.1 mol) of 4,4'-diaminobenzanilide are dissolved under nitrogen in 2100 g of N-methylpyrrolidone and 91.2 g (0.4 mol) of terephthalic acid dichloride are added in the course of 60 minutes at between 20° C. and 50° C. The solution is stirred for a further period at 72° C. When the desired viscosity ($\eta_{inh}$=5.8 dl/g) is reached, the polycondensation is stopped by adding 1.2 g of acetyl chloride and the reaction mixture is then neutralized with 24.5 g of calcium oxide. The solution is filtered, degassed and spun wet. To this end, it is spun at a speed of 16.0 m/min from a die having 100 orifices each 0.1 mm in diameter into a coagulation bath consisting of a hot solution of 35% N-methylpyrrolidone in water at 80° C. The resulting filaments are stretched 14.4-fold through two water baths and a washing machine, over a drying godet and finally by means of an iron at a temperature of 450° C.

The individual filament titer is 1.63 dtex at a fineness-related strength of 143 cN/tex, an elongation of 2.9% and an initial modulus of 52 N/tex, based on 100% elongation.

EXAMPLES 2 TO 7

Further aromatic copolyamides are prepared, spun and tested using the procedure described in Example 1. The diamines used, their proportions, the solution viscosities of the resulting polymers, the spinning conditions and the properties of the resulting fibers are listed in Table I below. The dicarboxylic acid component used is terephthalic acid dichloride in each case. The following abbreviations are used in Table I for the diamines:

| PPD = p-phenylenediamine<br>DADPE = 3,4'-diaminodiphenyl ether<br>DABA = 4,4'-diaminobenzanilide | | | | | | |
|---|---|---|---|---|---|---|
| Example No. | 2 | 3 | 4 | 5 | 6 | 7 |
| PPD (mol %) | 10 | 30 | 40 | 20 | 25 | 40 |
| DADPE (mol % | 50 | 40 | 30 | 60 | 50 | 45 |
| DABA (mol %) | 40 | 30 | 30 | 20 | 25 | 15 |
| Individual filament titer (dtex) | 1.67 | 0.87 | 1.35 | 0.51 | 1.48 | 0.95 |
| Tear strength (cN/tex) | 136 | 119 | 34 | 121 | 146 | 126 |
| Elongation (%) | 2.5 | 2.6 | 1.4 | 2.3 | 3.2 | 2.3 |
| Modulus of elasticity (N/tex) | 56 | 52 | 28 | 57 | 48 | 59 |
| Stretching ratio 1: | 10 | 8.5 | 8.5 | 9.0 | 8.9 | 8.1 |

We claim:

1. An aromatic copolyamide which is soluble in organic polyamide solvents and essentially consists of at least 95 mol % of recurring structural units of the formulae Ia, Ib and Ic with or without up to 5 mol % of recurring structural units of the formula Id $$[-OC-R^1-CO-NH-R^2-NH-], \quad \text{(Ia)}$$

$$[-OC-R^1-CO-NH-R^3-NH-], \quad \text{(Ib)}$$

$$[-OC-R^1-CO-NH-R^4-NH-], \quad \text{(Ic)}$$

$$[-OC-R^1-CO-NH-R^5-NH-], \quad \text{(Id)}$$

wherein at least 95 mol % of all radicals $R^1$ have a structure of the formula IIa and up to 5 mol % of all radicals $R^1$ have a structure of the formula IIb $$-Ar^1-, \quad \text{(IIa)}$$

$$-Ar^2-, \quad \text{(IIb)}$$

wherein $Ar^1$ is a divalent aromatic radical, the valency bonds of which are in the para position or a comparable coaxial or parallel position relative to one another, and which is optionally substituted by one or two inert radicals, and $Ar^2$ is a divalent aromatic radical, the valency bonds of which are in the meta position or in a comparable angled position relative to one another, and which is optionally substituted by one or two inert radicals, $R^2$ is a radical of the formula III

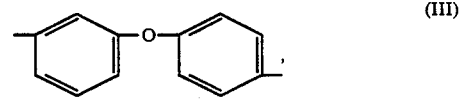

$R^3$ is a radical of the formula IV

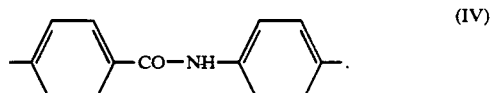

$R^4$ is a divalent aromatic radical other than the radical of the formula IV, the valency bonds of which are in the para position or in a comparable coaxial or parallel position relative to one another, and which is optionally substituted by one or two inert radicals, and $R^5$ is a radical which is selected from one of the structures defined for $Ar^2$, on condition that the mole fractions of the radicals $R^2$, $R^3$ and $R^4$, based on the sum of these radicals, lie within the following limits:

Radical $R^2$: 30 to 70 mol %.
Radical $R^3$: 10 to 60 mol %, and
Radical $R^4$: 10 to 60 mol %.

2. A copolyamide as claimed in claim 1, wherein $Ar^1$ is 1,4-phenylene, $Ar^2$ is 1,3-phenylene and $R^4$ is 1,4-phenylene.

3. A copolyamide as claimed in claim 1, wherein the mole fractions of the radicals $R^2$, $R^3$ and $R^4$, based on the sum of these radicals, are within the following limits:

Radical $R^2$: 40 to 60 mol %,
Radical $R^3$: 20 to 30 mol %, and
Radical $R^4$: 20 to 30 mol %.

4. A copolyamide as claimed in claim 1, wherein all radicals $R^1$ are 1,4-phenylene and $R^4$ is 1,4-phenylene.

5. A copolyamide as claimed in claim 1, wherein radical $R^2$ is 40 to 60 mol %.

6. A copolyamide as claimed in claim 1, wherein radical $R^3$ is 10 to 40 mol %.

7. A copolyamide as claimed in claim 1, wherein radical $R^4$ is 10 to 40 mol %.

8. A copolyamide as claimed in claim 1, wherein radical $R^2$ is 40 to 60 mol %, radical $R^3$ is 10 to 40 mol %, and radical $R^4$ is 10 to 40 mol %.

9. A copolyamide as claimed in claim 1, wherein the inert radicals are selected from the group consisting of chlorine, $C_1$-$C_6$-alkyl and $C_1$-$C_6$-alkoxy.

10. A copolyamide as claimed in claim 9, wherein the inert radicals are chlorine, methoxy or methyl.

11. A filament, fiber, yarn, film or sheet comprising an aromatic copolyamide as claimed in claim 1.

* * * * *